United States Patent
Onuma et al.

(10) Patent No.: US 9,515,329 B2
(45) Date of Patent: Dec. 6, 2016

(54) FUEL CELL SYSTEM

(71) Applicant: PANASONIC INTELLECTUAL PROPERTY MANAGEMENT CO., LTD., Osaka (JP)

(72) Inventors: Shigenori Onuma, Kyoto (JP); Kunihiro Ukai, Nara (JP); Takehiro Maruyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 81 days.

(21) Appl. No.: 14/407,462

(22) PCT Filed: Feb. 20, 2014

(86) PCT No.: PCT/JP2014/000877
§ 371 (c)(1),
(2) Date: Dec. 11, 2014

(87) PCT Pub. No.: WO2014/167764
PCT Pub. Date: Oct. 16, 2014

(65) Prior Publication Data
US 2015/0270559 A1 Sep. 24, 2015

(30) Foreign Application Priority Data
Apr. 11, 2013 (JP) ................. 2013-083269

(51) Int. Cl.
*H01M 8/04* (2016.01)
*H01M 8/06* (2016.01)
*H01M 8/12* (2016.01)

(52) U.S. Cl.
CPC ..... *H01M 8/04014* (2013.01); *H01M 8/04074* (2013.01); *H01M 8/0618* (2013.01); *H01M 8/0675* (2013.01); *Y02E 60/50* (2013.01)

(58) Field of Classification Search
CPC ............... H01M 8/04014; H01M 8/04074; H01M 8/0618; H01M 8/0675; Y02E 60/50
See application file for complete search history.

(56) References Cited

U.S. PATENT DOCUMENTS

| 5,082,752 A | 1/1992 | Koga et al. |
| 2002/0114747 A1* | 8/2002 | Marchand ............ B01D 53/885 422/198 |

(Continued)

FOREIGN PATENT DOCUMENTS

| JP | 11-189401 A | 7/1999 |
| JP | 2003-317783 A | 11/2003 |

(Continued)

OTHER PUBLICATIONS

Extended European Search Report dated Dec. 23, 2015 issued in European Patent Application No. 14782374.4.

(Continued)

*Primary Examiner* — Gregg Cantelmo
(74) *Attorney, Agent, or Firm* — McDermott Will & Emery LLP

(57) ABSTRACT

A fuel cell system including a fuel cell; a cathode air heat exchanger configured to perform heat exchange between a cathode exhaust gas and the air to be supplied to the cathode to transfer a part of heat energy of the cathode exhaust gas to the air; a desulfurization unit configured to remove a sulfur component from a raw material supplied to the desulfurization unit; and a reformer configured to generate a reformed gas which is the fuel from steam and the raw material from which the sulfur component has been removed by the desulfurization unit; and the cathode exhaust gas which has lost a part of the heat energy by the heat exchange in at least the cathode air heat exchanger, is supplied to the (Continued)

desulfurization unit, to heat the desulfurization unit by the heat energy of the cathode exhaust gas.

11 Claims, 6 Drawing Sheets

(56) References Cited

U.S. PATENT DOCUMENTS

| | | |
|---|---|---|
| 2009/0035610 A1 | 2/2009 | Kivisaari et al. |
| 2011/0189567 A1 | 8/2011 | Venkataraman et al. |
| 2013/0273445 A1 | 10/2013 | Kobayashi |

FOREIGN PATENT DOCUMENTS

| | | |
|---|---|---|
| JP | 2008-016340 A | 1/2008 |
| JP | 2009-234837 A | 10/2009 |
| JP | 2011-181268 A | 9/2011 |
| JP | 2012-155978 A | 8/2012 |
| JP | 2012-204330 A | 10/2012 |
| JP | 2013-239404 A | 11/2013 |

OTHER PUBLICATIONS

Japanese Office Action issued in Japanese Application No. 2014-546233 dated Jun. 2, 2015.
International Search Report issued in International Application No. PCT/JP2014/000877 with Date of mailing Apr. 22, 2014, with English Translation.

* cited by examiner

FUEL CELL SYSTEM

RELATED APPLICATIONS

This application is the U.S. National Phase application under 35 U.S.C. §371 of International Application No. PCT/JP2014/000877, filed on Feb. 20, 2014, which in turn claims the benefit of Japanese Application No. 2013-083269, filed on Apr. 11, 2013, the disclosures of which Applications are incorporated by reference herein.

TECHNICAL FIELD

The present invention relates to a fuel cell system including a desulfurization unit for desulfurizing a sulfur component from a raw material of an organic compound containing at least the sulfur component. Particularly, the present invention relates to a fuel cell system including the desulfurization unit for desulfurizing the sulfur component from the raw material, by a hydrodesulfurization method.

BACKGROUND ART

In recent years, development and commodification of a fuel cell system as a distributed power generation system progresses. The fuel cell system is supplied as a raw material an organic compound containing carbon and hydrogen components. The fuel cell system generates hydrogen by reforming the supplied raw material, for example, within a fuel cell. Or, the fuel cell system includes a reformer outside the fuel cell, and the reformer reforms the raw material to generate a reformed gas containing hydrogen. The fuel cell generates electricity and heat, through a power generation reaction by using hydrogen thus generated and air supplied from outside.

The fuel cell system configured as described above can efficiently attain electric energy and heat energy, and therefore is expected as an energy supply system which can effectively reduce carbon dioxide which is a cause of global warming.

As the raw material supplied to the fuel cell system, for example, a liquefied petroleum gas (LPG), a liquefied natural gas (LNG), a city gas, a shale gas, methane hydrate, etc., may be used. Each of these raw materials contains an odor substance added thereto. The raw material itself or the odor substance added to the raw material contains a sulfur component. If the raw material containing this sulfur component is supplied to an anode of the fuel cell through the reformer, or the like, this sulfur component may poison the anode, which will result in a situation in which fuel cell performance is degraded, or the reforming catalyst included in the reformer is poisoned and thereby a reforming capability is degraded. Because of this, it becomes necessary to supply the raw material to the anode and the reformer after the sulfur component in the raw material is reduced to ppb order.

To this end, the fuel cell system includes a desulfurization unit having a function of reducing the sulfur component in the raw material, at the upstream side of the reformer. As a method of removing the sulfur component from the raw material by the desulfurization unit, there is a room temperature desulfurization method that removes the sulfur component by physically adsorbing the sulfur component to a catalyst at a room temperature, a hydrodesulfurization method that removes the sulfur component by using hydrogen, etc. In the case of the hydrodesulfurization method, the catalyst having an active temperature range of a predetermined temperature (e.g., about 250 degrees C. to 320 degrees C.) is filled into the desulfurization unit. The desulfurization unit generates hydrogen sulfide from the raw material and hydrogen supplied from outside, and chemically adsorbs sulfur of hydrogen sulfide to the catalyst.

By the way, it is necessary to heat the desulfurization unit to keep the desulfurization unit at the predetermined temperature (e.g., about 250 degrees C. to 320 degrees C., in the case of the hydrodesulfurization method), to steadily remove the sulfur component. For example, Patent Literatures 1, 2 disclose fuel cell systems which are configured to heat the desulfurization unit up to the predetermined temperature.

Specifically, Patent Literature 1 discloses the fuel cell system which is configured to heat the desulfurization unit in the manner as described below. An anode off-gas discharged from the anode of the fuel cell and a cathode off-gas discharged from the cathode of the fuel cell are combusted together to generate a combustion exhaust gas (fuel cell exhaust gas). This combustion exhaust gas is caused to exchange heat with cathode air to be supplied to the cathode, and a part of the heated cathode air is supplied to the desulfurization unit as a heat source.

Patent Literature 2 discloses the fuel cell system in which water (reforming water) supplied to the reformer as a reforming material deprives heat from a burner, and this heat is transferred to a desulfurization catalyst, to keep the desulfurization unit at a predetermined temperature.

CITATION LIST

Patent Literature

Patent Literature 1: Japanese Laid-Open Patent Application Publication No. 2011-181268
Patent Literature 2: Japanese Laid-Open Patent Application Publication No. 2009-234837

SUMMARY OF INVENTION

Technical Problem

However, the conventional fuel cell system has a problem that the desulfurization unit cannot be heated up to an appropriate temperature for the desulfurization.

More specifically, Patent Literature 1 discloses that the flow of the cathode air to be supplied to the cathode is divided such that the cathode air flows through a desulfurization air supply line and a cathode air supply line, in order to heat a part of the cathode air by a combustion exhaust gas. These supply lines are provided with flow control valves, respectively. In this configuration, the flow control valves are controlled to control the flow rate of the cathode air to be supplied to the desulfurization unit.

As described above, according to Patent Literature 1, the flow control valves are provided and controlled. However, it is difficult to control the flow rate of the cathode air flowing through the desulfurization air supply line and the flow rate of the cathode air flowing through the cathode air supply line reach appropriate flow rates, respectively. This makes it difficult to supply the heated cathode air to the desulfurization unit at an appropriate flow rate. Therefore, there is a possibility that the temperature of the desulfurization unit cannot be kept at the appropriate temperature. Furthermore, since the fuel cell system disclosed in Patent Literature 1 is additionally provided with the flow control valves, its configuration becomes complex, and cost increases.

As described above, the fuel cell system disclosed in Patent Literature 2 is configured such that the water supplied to the reformer as the reforming raw material deprives the heat from a burner, and this heat is transferred to the desulfurization catalyst. Therefore, this fuel cell system is appropriate for the case where the temperature of the desulfurization unit is kept at about 100 degrees C., but is incapable of realizing the predetermined temperature (e.g., about 250 degrees C. to 320 degrees C.) required for the hydrodesulfurization.

The present invention is developed in view of the above described problem, and an object of the present invention is to provide a fuel cell system which is capable of heating the desulfurization unit up to a temperature appropriate for the desulfurization.

Solution to Problem

To solve the above described problem, according to an aspect of the present invention, there is provided a fuel cell system comprising: a fuel cell configured to generate electric power through a power generation reaction by using fuel supplied to an anode and air supplied to a cathode; a cathode air heat exchanger configured to perform heat exchange between a cathode exhaust gas which is air discharged after the air has been used in the fuel cell and the air to be supplied to the cathode to transfer a part of heat energy of the cathode exhaust gas to the air; a desulfurization unit configured to remove a sulfur component from a raw material supplied to the desulfurization unit; and a reformer configured to generate a reformed gas which is the fuel from steam and the raw material from which the sulfur component has been removed by the desulfurization unit, wherein the cathode exhaust gas which has lost a part of the heat energy by the heat exchange in at least the cathode air heat exchanger, is supplied to the desulfurization unit, to heat the desulfurization unit by the heat energy of the cathode exhaust gas.

Advantageous Effects of Invention

The fuel cell system of the present invention is configured as described above, and has an advantage that the desulfurization unit can be heated up to a temperature which is appropriate for the desulfurization.

DESCRIPTION OF EMBODIMENTS

Figure 1:
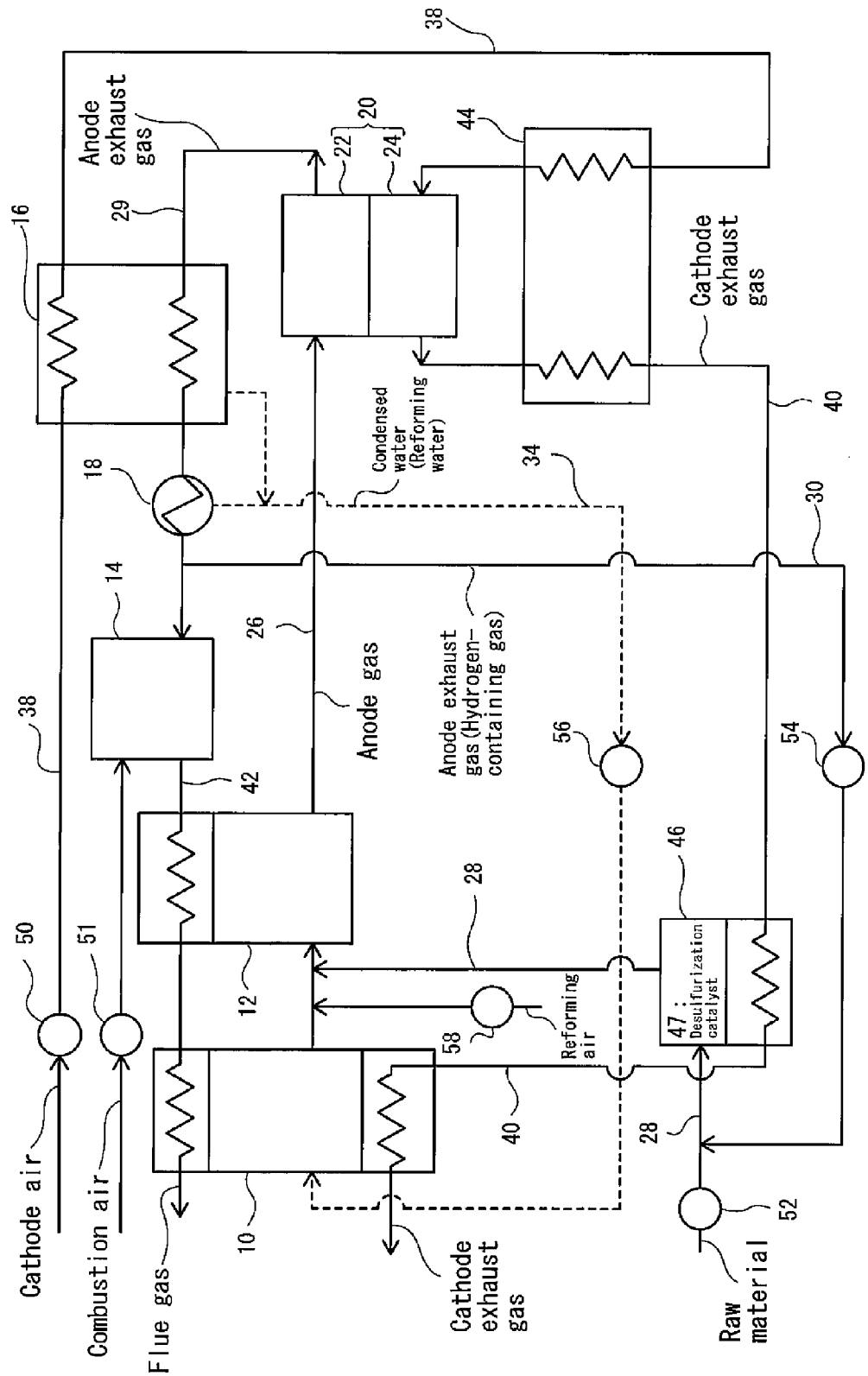
FIG. 1 is a block diagram showing the example of a fuel cell system according to Embodiment 1.

The present invention provides aspects described below.

According to a first aspect of the present invention, there is provided a fuel cell system comprising: a fuel cell configured to generate electric power through a power generation reaction by using fuel supplied to an anode and air supplied to a cathode; a cathode air heat exchanger configured to perform heat exchange between a cathode exhaust gas which is air discharged after the air has been used in the fuel cell and the air to be supplied to the cathode to transfer a part of heat energy of the cathode exhaust gas to the air; a desulfurization unit configured to remove a sulfur component from a raw material supplied to the desulfurization unit; a reformer configured to generate a reformed gas which is the fuel from steam and the raw material from which the sulfur component has been removed by the desulfurization unit, wherein the cathode exhaust gas which has lost a part of the heat energy by the heat exchange in at least the cathode air heat exchanger, is supplied to the desulfurization unit, to heat the desulfurization unit by the heat energy of the cathode exhaust gas.

In accordance with this configuration, since the fuel cell system includes the cathode air heat exchanger, the air to be supplied to the cathode is pre-heated, while the cathode exhaust gas which has been discharged from the cathode loses a part of its heat energy. The cathode exhaust gas which has lost a part of its heat energy by the heat exchange in at least the cathode air heat exchanger and has been lowered in temperature, is supplied to the desulfurization unit, and the desulfurization unit can be heated by the heat energy of the cathode exhaust gas which has been lowered in temperature. In brief, the temperature of the cathode exhaust gas can be lowered by the cathode air heat exchanger so that the desulfurization unit can be heated at an appropriate temperature, and the cathode exhaust gas which has been adjusted to this appropriate temperature can be supplied to the desulfurization unit.

Therefore, the fuel cell system of the present invention has an advantage that the desulfurization unit can be heated up to a temperature which is appropriate for the desulfurization.

Note that the cathode exhaust gas supplied to the desulfurization unit is a gas which has lost a part of its heat energy by the heat exchange in at least the cathode air heat exchanger. Therefore, the cathode exhaust gas may be directly supplied from the cathode air heat exchanger to the desulfurization unit. Or, the cathode exhaust gas which has further lost a part of its heat energy by additional heat exchange in another heat exchanger, or the like, may be supplied to the desulfurization unit.

According to a second aspect of the present invention, the fuel cell system according to the first aspect may further comprise an anode exhaust gas condenser configured to perform heat exchange between an anode exhaust gas discharged from the anode after an anode gas has been used as the fuel in the fuel cell and the air to be supplied to the cathode (cathode air which is before being supplied to the cathode, i.e., cathode air which is not supplied to the cathode yet at the present time and supplied to the cathode later) such that a part of the heat energy of the anode exhaust gas is transferred to the air, to condense the anode exhaust gas to recover condensed water, wherein the air which has been pre-heated by a part of heat energy of the anode exhaust gas by the heat exchange in the anode exhaust gas condenser may be supplied to the cathode air heat exchanger.

In accordance with this configuration, since the fuel cell system includes the anode exhaust gas condenser, the anode exhaust gas can be condensed to recover the condensed water. Therefore, even in a place where an outside air temperature is high, the condensed water can be recovered from the anode exhaust gas, and the fuel cell system can be operated while supplying the water in a self-sustainable manner within the system. In addition, it becomes possible to prevent a situation in which the anode exhaust gas is condensed and clogging of water occurs in an intermediate portion of a passage through which the anode exhaust gas flows.

Moreover, the air is pre-heated in the anode exhaust gas condenser and then supplied to the cathode air heat exchanger. The air can be further heated in the cathode air heat exchanger. Therefore, the air having been pre-heated appropriately can be supplied to the cathode.

According to a third aspect of the present invention, in the fuel cell system according to the second aspect, the desulfurization unit may be configured to remove the sulfur component from the raw material by a hydrodesulfurization method.

According to a fourth aspect of the present invention, the fuel cell system according to the third aspect may further comprise a recycle passage which is configured to divide a flow of the anode exhaust gas from which the condensed water has been recovered in the anode exhaust gas condenser such that a part of the anode exhaust gas is supplied to an upstream side of the desulfurization unit, and the desulfurization unit may be configured to include a desulfurization catalyst which adsorbs the sulfur component in the raw material, of a mixture gas of the part of the anode exhaust gas and the raw material.

In accordance with this configuration, since the fuel cell system includes the recycle passage, the flow of the anode exhaust gas can be divided and a part of the anode exhaust gas which is a hydrogen-containing gas can be guided to the desulfurization unit through the recycle passage. This allows the desulfurization unit to perform desulfurization in such a manner that it adsorb the sulfur component in the raw material onto the desulfurization catalyst by the hydrodesulfurization method, by using hydrogen contained in the anode exhaust gas.

According to a fifth aspect of the present invention, the fuel cell system according to any one of the second to fourth aspects, may further comprise a combustion unit configured to combust the anode exhaust gas from which the condensed water has been recovered in the anode exhaust gas condenser, by using combustion air supplied to the combustion unit, and the reformer may be configured to generate the reformed gas from the raw material and the steam which are supplied to the reformer, through a reforming reaction, by using heat energy of a combustion exhaust gas generated by combustion of the anode exhaust gas in the combustion unit.

In accordance with this configuration, since the fuel cell system includes the combustion unit, the reformer can be heated up to a predetermined temperature by using the heat energy of the combustion exhaust gas generated by the combustion unit. This allows the reformer to be heated up to the predetermined temperature which is required to proceed the reforming reaction. As a result, the reforming reaction can be performed efficiently.

According to a sixth aspect of the present invention, the fuel cell system according to the fifth aspect may further comprise an evaporation unit which is supplied with the combustion exhaust gas discharged after a part of the heat energy of the combustion exhaust gas has been used in the reformer, and evaporates the condensed water by using the heat energy of the combustion exhaust gas to generate the steam added to the raw material to be supplied to the reformer.

In accordance with this configuration, the evaporation unit is supplied with the combustion exhaust gas which has lost a part of its energy due to the use of the heat energy in the reformer, and evaporates the condensed water by using the heat energy of the combustion exhaust gas. Thus, the evaporation unit can generate the steam by efficiently using the heat energy of the combustion exhaust gas.

According to a seventh aspect of the present invention, the fuel cell system according to the fifth aspect may further comprise an evaporation unit which is supplied with the combustion exhaust gas discharged after a part of the heat energy of the combustion exhaust gas has been used in the reformer and the cathode exhaust gas discharged after a part of the heat energy of the cathode exhaust gas has been used by heating the desulfurization unit, and evaporates the condensed water by the heat energy of the combustion exhaust gas and the heat energy of the cathode exhaust gas to generate the steam added to the raw material to be supplied to the reformer.

In accordance with this configuration, the fuel cell system includes the evaporation unit, which is supplied with the combustion exhaust gas which has lost a part of its heat energy due to the use of the heat energy in the reformer and the cathode exhaust gas which has lost a part of its heat energy due to the use of the heat energy in the desulfurization unit. Therefore, for example, even in a case where the condensed water cannot be sufficiently evaporated if only the heat energy of the combustion exhaust gas is used, the heat energy of the cathode exhaust gas can make up for the deficiency of the heat energy required for the evaporation of the condensed water.

According to an eighth aspect of the present invention, the fuel cell system according to the fifth aspect may further comprise an evaporation unit which is supplied with the combustion exhaust gas discharged after a part of the heat energy of the combustion exhaust gas has been used in the reformer and the cathode exhaust gas discharged after a part of the heat energy of the cathode exhaust gas has been used by the heat exchange in the cathode air heat exchanger, and evaporates the condensed water by the heat energy of the combustion exhaust gas and the heat energy of the cathode exhaust gas to generate the steam added to the raw material to be supplied to the reformer; and the cathode exhaust gas discharged after a part of the heat energy of the cathode exhaust gas has been used in the evaporation unit may be supplied to the desulfurization unit to heat the desulfurization unit by the heat energy of the cathode exhaust gas.

In accordance with this configuration, the fuel cell system includes the evaporation unit, which is supplied with the combustion exhaust gas which has lost a part of its heat energy due to the use of the heat energy in the reformer and the cathode exhaust gas which has lost a part of its heat energy due to the use of the heat energy in the desulfurization unit. Therefore, for example, even in a case where the condensed water cannot be sufficiently evaporated if only the heat energy of the combustion exhaust gas is used, the heat energy of the cathode exhaust gas can make up for the deficiency of the heat energy required for the evaporation of the condensed water.

In addition, the cathode exhaust gas which is discharged after the heat exchange in the cathode air heat exchanger is supplied to the evaporation unit, the heat energy is used in the evaporation unit, and thereafter the cathode exhaust gas is supplied to the desulfurization unit. Even in a case where the temperature of the cathode exhaust gas cannot be decreased to an optimal temperature for heating of the desulfurization unit, as a result of the heat exchange in the cathode air heat exchanger, the cathode exhaust gas with an optimal temperature can be supplied to the desulfurization unit, because the cathode exhaust gas is supplied to the desulfurization unit after the heat energy of the cathode exhaust gas has been used in the evaporation unit. This allows the desulfurization unit to perform desulfurization appropriately.

According to a ninth aspect of the present invention, the fuel cell system according to the seventh aspect may further comprise a heat exchanger configured to perform heat exchange between the cathode exhaust gas discharged after a part of the heat energy of the cathode exhaust gas has been used in the evaporation unit and the combustion air to be supplied to the combustion unit.

According to a tenth aspect of the present invention, the fuel cell system according to the eighth aspect may further comprise a heat exchanger configured to perform heat exchange between the cathode exhaust gas discharged after a part of the heat energy of the cathode exhaust gas has been used in the desulfurization unit and the combustion air to be supplied to the combustion unit.

Hereinafter, specific examples of the embodiments will be described with reference to the drawings.

Throughout the drawings, the same or corresponding components are designated by the same reference symbols and will not be described repeatedly.

(Embodiment 1)

Initially, Embodiment 1 of the present invention will be described with reference to FIG. 1. FIG. 1 is a block diagram showing the example of a fuel cell system according to Embodiment 1. As shown in FIG. 1, the fuel cell system according to Embodiment 1 includes an evaporation unit 10, a reformer 12, a combustion unit 14, an anode exhaust gas condenser 16, an anode exhaust gas heat radiator 18, a fuel cell 20, a cathode air heat exchanger 44, and a desulfurization unit 46 incorporating a desulfurization catalyst 47.

In the fuel cell system according to Embodiment 1, power generation is performed as follows. Specifically, in the fuel cell system according to Embodiment 1, initially, a raw material is supplied to the desulfurization unit 46. The desulfurization unit 46 removes a sulfur component from the raw material by, for example, hydrodesulfurization, and supplies the desulfurized raw material to the reformer 12. Hydrogen required for performing the hydrodesulfurization in the desulfurization unit 46 is obtained from a part of an anode exhaust gas, the part of the anode exhaust gas resulting from dividing of the flow of the anode exhaust gas including an anode gas (reformed gas) remaining unused in the fuel cell 20, as will be described in detail later.

The reformer 12 is supplied with steam generated by evaporation of condensed water in the evaporation unit 10 and reforming air supplied from outside, in addition to the above desulfurized raw material. In the fuel cell system according to Embodiment 1, the anode exhaust gas is condensed to generate condensed water and the condensed water is used as reforming water, as will be described in detail later. The reformer 12 reforms the raw material supplied thereto by using the steam generated by evaporation of the condensed water and the reforming air. The reformer 12 generates the anode gas (reformed gas) containing hydrogen as fuel of the fuel cell 20, and supplies this anode gas to the fuel cell 20.

A cathode 24 of the fuel cell 20 is supplied with cathode air (air) from outside. The fuel cell 20 generates electric power through a power generation reaction by using the cathode air supplied to the cathode 24 and the anode gas supplied to the anode 22. The electric power generated by the power generation in the fuel cell 20 is supplied to an external load via a terminal (not shown). The outside load may be, for example, a device constituting a wireless base station, such as a cellular phone, a distributed power generation device for household use or business use, or a cogeneration apparatus.

As the fuel cell 20 of the fuel cell system according to Embodiment 1, a solid oxide fuel cell (SOFC) will be exemplarily described. However, the fuel cell 20 is not limited to this so long as it discharges the anode off-gas containing hydrogen. For example, the fuel cell such as the solid oxide fuel cell or a molten carbonate fuel cell (MCFC) has advantages that generated water (steam) is contained in the anode off-gas and the water can be condensed from the anode off-gas efficiently even in a place where an outside temperature is high.

As the raw material supplied from outside to the fuel cell system according to Embodiment 1, for example, a gas containing an organic compound such as LPG gas, a propane gas, a butane gas, or a city gas containing methane as a major component, heating oil, alcohol, etc., may be used. In a case where a liquid raw material such as the heating oil or alcohol is used as the raw material, the raw material may be evaporated by heating before it is supplied to the reformer 12.

The reformer 12 of the fuel cell system according to Embodiment 1 performs oxidative steam reforming by using hydrocarbon contained in the desulfurized raw material and oxygen contained in the reforming air. Note that the reforming reaction performed in the reformer 12 is not limited to the oxidative steam reforming, but may be partial oxidation reforming, autothermal reforming, or steam reforming. In a case where the reformer 12 performs the oxidative steam reforming, the reforming reaction easily proceeds in terms of heat balance, and the size of the reformer 12 can be made smaller than that in the case of using the steam reforming, which provides an advantage. In addition, in the case of the oxidative steam reforming, the sulfur component is converted into $SO_2$ and then easily converted into $H_2S$, and therefore, poisoning of the electrode catalyst of the anode 22 within the fuel cell 20 can be suppressed, even when the sulfur component is contained in the raw material, which also provides an advantage.

The reformer 12 of the fuel cell system according to Embodiment 1 is configured in such a manner that a reforming catalyst is filled into a casing, for example. As the reforming catalyst filled into the casing, for example, an alumina carrier impregnated with at least one of nickel, ruthenium, platinum and rhodium may be used. The reforming catalyst is not particularly limited. For example, various catalysts may be used so long as they allow the oxidative steam reforming to proceed. The reformer 12 is required to be kept at a predetermined temperature so that the oxidative steam reforming proceeds. In Embodiment 1, the combustion unit 14 combusts the anode exhaust gas to generate a combustion exhaust gas, and the reformer 12 is heated up to the predetermined temperature by the heat energy of the combustion exhaust gas.

As described above, the fuel cell 20 generates the electric power by using the anode gas which is the reformed gas supplied to the anode 22 via the reformer 12 and the cathode air supplied to the cathode 24. To realize this, as shown in FIG. 1, a cathode air passage 38 through which the cathode air flows is provided with a cathode air supply unit 50, in an intermediate position. The cathode air supply unit 50 controls the flow rate of the air supplied to the cathode 24. Also, a raw material passage 28 through which the raw material flows is provided with a raw material supply unit 52 in an intermediate position. The raw material supply unit 52 controls the flow rate of the raw material supplied to the anode 22.

Also, as described above, the fuel cell 20 includes the anode 22 which is supplied with the anode gas generated by the reforming in the reformer 12 and the cathode 24 which is supplied with the cathode air, and is configured to include, a plurality of unit fuel cells which are connected in series and generate electric power through a power generation reaction between the anode 22 and the cathode 24.

The unit fuel cells may have a known configuration using, for example, yttria-stabilized zirconia (YSZ) which is zirconia ($ZrO_2$) which is added with yttrium (Y) oxide ($Y_2O_3$), as an electrolyte and the like. As the material of the unit fuel cell, zirconia doped with ytterbium (Yb) or scandium (Sc), or a lanthanum gallate based solid electrolyte may be used. In the unit fuel cell incorporating YSZ, the power generation reaction takes place in a temperature range of, for example, about 600 degrees C. to about 1000 degrees C., although this depends on the thickness of the electrolyte. As the electrode material of the anode 22, for example, a mixture of nickel and YSZ, etc., may be used. As the electrode material of the cathode 24, for example, an oxide ($La_{0.8}Sr_{0.2}MnO_3$) containing lanthanum, strontium, and manganese, an oxide ($La_{0.6}Sr_{0.4}Co_{0.2}Fe_{0.8}O_3$) containing lanthanum, strontium, cobalt, and iron, etc., are used. The cell of the fuel cell 20 has, for example, a flat plate shape, and is configured such that the anode exhaust gas and the cathode exhaust gas are separately discharged from the fuel cell 20. The structure of the fuel cell 20 is not particularly limited to the flat plate shape, but may be, for example, a cylindrical shape or a cylindrical flat plate shape, so long as the anode exhaust gas and the cathode exhaust gas are separately discharged from the fuel cell 20.

The passages of the fluids supplied to the fuel cell system configured as described above are chiefly classified into passages (cathode air passage 38, cathode exhaust gas passage 40) through which the cathode air and the cathode exhaust gas flow, and passages (raw material passage 28, anode gas passage 26, anode exhaust gas passage 29, combustion exhaust gas passage 42) through which the raw material, the anode gas, the anode exhaust gas, and the combustion exhaust gas flow. Hereinafter, these passages will be individually described.

(Passages Through which Cathode Air and Cathode Exhaust Gas Flow)

Firstly, the passage through which the cathode air flows and the passage through which the cathode exhaust gas flows will be described.

The cathode air supply unit 50 supplies the cathode air to an anode exhaust gas condenser 16 through the cathode air passage 38. The cathode air supplied to the anode exhaust gas condenser 16 is heated (pre-heated) by heat exchange with the anode exhaust gas supplied to the anode exhaust gas condenser 16 through a passage different from the cathode air passage 38. The pre-heated cathode air is supplied to a cathode air heat exchanger 44. The cathode air heat exchanger 44 is supplied with the cathode air to be supplied to the cathode 24 (cathode air which is before being supplied to the cathode 24, i.e., cathode air which is not supplied to the cathode 24 yet at the present time and supplied to the cathode 24 later) of the fuel cell 20 and the cathode exhaust gas which has been discharged from the cathode 24, and performs heat exchange between the cathode air and the cathode exhaust gas.

The cathode exhaust gas which has just been discharged from the cathode 24 is in a high temperature state of about 850 degrees C. For this reason, the cathode air is heated up to about 650 degrees C. by the heat exchange with the cathode exhaust gas in the cathode air heat exchanger 44. Conversely, the cathode exhaust gas is supplied to the desulfurization unit 46 through the cathode exhaust gas passage 40, in a state in which its temperature has been lowered to, for example, about 350 degrees C. to 380 degrees C. While flowing through the cathode exhaust gas passage 40, the cathode exhaust gas radiates heat, and is supplied to the desulfurization unit 46 in a state in which its temperature has been lowered to, for example, about 250 degrees C. to 320 degrees C.

In a case where the cathode exhaust gas does not substantially radiate heat in the cathode exhaust gas passage 40, the temperature of the cathode exhaust gas can be adjusted to reach, for example, about 250 degrees C. to 320 degrees C., by changing the flow rates of the cathode air and of the cathode exhaust gas flowing through the cathode air heat exchanger 44, or by increasing the range in which the heat exchange between the cathode air and the cathode exhaust gas occurs.

As described above, since the desulfurization unit 46 is supplied with the cathode exhaust gas in the temperature state of about 250 degrees C. to 320 degrees C., the desulfurization unit 46 can be heated up to a temperature desired in the hydrodesulfurization method, by using a part of the heat energy of the cathode exhaust gas. Then, the cathode exhaust gas which has lost a part of its heat energy as a result of heating of the desulfurization unit 46, is supplied to the evaporation unit 10. In the evaporation unit 10, a part of the heat energy of the cathode exhaust gas is used to evaporate the condensed water.

(Passages Through which Raw Material, Anode Gas, Anode Exhaust Gas, and Combustion Exhaust Gas Flow)

Next, the passages through which the raw material, the anode gas, the anode exhaust gas, and the combustion exhaust gas flow, will be described in more detail.

The raw material which is caused to flow through the raw material passage 28 by a raw material supply unit 52, is joined to a part of the anode exhaust gas which is caused to flow through a recycle passage 30 by a hydrogen supply unit 54, and then supplied to the desulfurization unit 46. As described above, the desulfurization unit 46 is kept at the predetermined temperature by the heat energy of the cathode exhaust gas. The desulfurization unit 46 generates hydrogen sulfide from the raw material supplied thereto and hydrogen contained in the anode exhaust gas, and chemically adsorbs sulfur in hydrogen sulfide to the desulfurization catalyst 47. The raw material from which sulfur has been removed in this way, is supplied to the reformer 12, together with the steam generated by evaporation of the condensed water in the evaporation unit 10 and the reforming air supplied by a reforming air pump 58.

The reformer 12 generates the reformed gas (anode gas) containing hydrogen by reforming the raw material supplied thereto, by using the steam generated by evaporation of the condensed water and the reforming air, as described above, and supplies this anode gas to the anode 22 of the fuel cell 20, through the anode gas passage 26. The anode gas supplied to the anode 22 of the fuel cell 20 is discharged as the anode exhaust gas. The anode exhaust gas is guided to the anode exhaust gas condenser 16 through the anode exhaust gas passage 29. Also, as described above, the cathode air to be supplied to the cathode 24 (cathode air which is before being supplied to the cathode 24) is guided to the anode exhaust gas condenser 16, and heat exchange between the anode exhaust gas and the cathode air occurs.

Thereby, a part of the heat energy of the anode exhaust gas which has been discharged from the fuel cell 20 and is in a high temperature state (e.g., about 850 degrees) is transferred to the cathode air, and as a result, the cathode air is heated. At this time, the temperature of the cathode air is increased from, for example, a room temperature up to about 260 degrees C.

Conversely, the anode exhaust gas loses a part of its heat energy by the heat exchange with the cathode air, and its temperature is lowered. Since the temperature is lowered, the anode exhaust gas is condensed to generate the condensed water. Then, the anode exhaust gas is cooled by heat exchange with atmospheric air in the anode exhaust gas heat radiator 18 placed downstream of the anode exhaust gas condenser 16. As a result of the heat exchange with the atmospheric air, lowering of the temperature of the anode exhaust gas progresses, and further condensation of the anode exhaust gas proceeds to generate the condensed water. The condensed water generated in the anode exhaust gas condenser 16 and the condensed water generated in the anode exhaust gas heat radiator 18 are sent out as reforming water to the evaporation unit 10 by a reforming water pump 56 through a condensed water passage 34.

Note that the anode exhaust gas heat radiator 18 is provided to increase the amount of the condensed water which can be recovered from the anode exhaust gas. Therefore, in a case where the condensed water of a flow rate required in the reformer 12 can be recovered by using only the anode exhaust gas condenser 16, the anode exhaust gas heat radiator 18 may be omitted.

The combustion unit 14 combusts the anode exhaust gas which has flowed through the anode exhaust gas heat radiator 18, together with combustion air. Specifically, a combustion air supply unit 51 supplies the combustion air to the combustion unit 14 from outside, and the combustion unit 14 combusts a mixture of the combustion air and the anode exhaust gas. The combustion exhaust gas generated by this combustion is guided to the reformer 12. By the heat energy of the combustion exhaust gas supplied to the reformer 12, the reformer 12 is heated up to a predetermined temperature required to proceed the oxidative steam reforming by the heat energy of the combustion exhaust gas supplied thereto.

The combustion exhaust gas which has lost a part of its heat energy in the reformer 12 is supplied to the evaporation unit 10. Then, in the evaporation unit 10, the condensed water is heated by the heat energy of the combustion exhaust gas. In other words, as described above, the evaporation unit 10 is configured to evaporate the condensed water by the heat energy of the cathode exhaust gas and the heat energy of the combustion exhaust gas. However, in a case where the condensed water can be sufficiently evaporated by only the heat energy of the combustion exhaust gas, it is not necessary to supply the cathode exhaust gas to the evaporation unit 10.

As described above, the fuel cell system according to Embodiment 1 is configured to recover the condensed water from the anode exhaust gas, and heat the desulfurization unit 46 to keep it at the predetermined temperature by using the cathode exhaust gas. The reason is as follows. Since the flow rate of the anode exhaust gas is less than that of the cathode exhaust gas is, and the anode exhaust gas contains more steam than the cathode exhaust gas does, the condensed water can be recovered more efficiently from the anode exhaust gas than from the cathode exhaust gas.

As should be understood from the above, it may be said that the fuel cell system according to Embodiment 1 includes the six heat exchangers (first heat exchanger to sixth heat exchanger), and is configured to perform heat exchange in each of these heat exchangers.

Specifically, the cathode air heat exchanger 44 performs heat exchange between the cathode air to be supplied to the cathode 24, and the cathode exhaust gas which has been discharged from the cathode 24. In brief, the cathode air heat exchanger 44 serves as the first heat exchanger.

In addition, the desulfurization unit 46 performs heat exchange between the cathode exhaust gas which has flowed through the cathode air heat exchanger 44, and the mixture gas of the raw material and a part of the anode exhaust gas, the part of the anode exhaust gas resulting from dividing of the flow of the anode exhaust gas. In brief, the desulfurization unit 46 serves as the second heat exchanger.

In addition, the anode exhaust gas condenser 16 performs heat exchange between the anode exhaust gas which has been discharged from the anode 22 and the cathode air. In brief, the anode exhaust gas condenser 16 serves as the third heat exchanger.

In addition, the anode exhaust gas heat radiator 18 performs heat exchange between the atmospheric air, and the anode exhaust gas which has lost a part of its heat energy by the heat exchange with the cathode air in the anode exhaust gas condenser 16. In brief, the anode exhaust gas heat radiator 18 serves as the fourth heat exchanger.

Furthermore, the reformer 12 performs heat exchange between the combustion exhaust gas generated by combusting the anode exhaust gas in the combustion unit 14 and the raw material which has been added with the steam generated by evaporation of the condensed water in the evaporation unit 10. This heat exchange makes it possible to obtain from the combustion exhaust gas reforming heat required to reform the raw material in the reformer 12. In brief, the reformer 12 serves as the fifth heat exchanger.

Moreover, the evaporation unit 10 performs heat exchange between the condensed water and the combustion exhaust gas which has lost a part of its heat energy in the reformer 12. The evaporation unit 10 further performs heat exchange between the condensed water and the cathode exhaust gas which has flowed through the desulfurization unit 46. This heat exchange makes it possible to obtain the heat energy required to evaporate the condensed water in the evaporation unit 10, from the combustion exhaust gas and the cathode exhaust gas. In brief, the evaporation unit 10 serves as the sixth heat exchanger.

As described above, the fuel cell system according to Embodiment 1 includes the cathode air supply unit 50, the combustion air supply unit 51, the raw material supply unit 52, and the hydrogen supply unit 54. The cathode air supply unit 50 and the combustion air supply unit 51 may be, for example, an air blower such as a blower. The raw material supply unit 52 may be, for example, a raw material booster, a pressure reducing unit, etc. The hydrogen supply unit 54 may be, for example, a pump, an ejector, an orifice, etc.

(Configuration of Desulfurization Unit)

Figure 2:
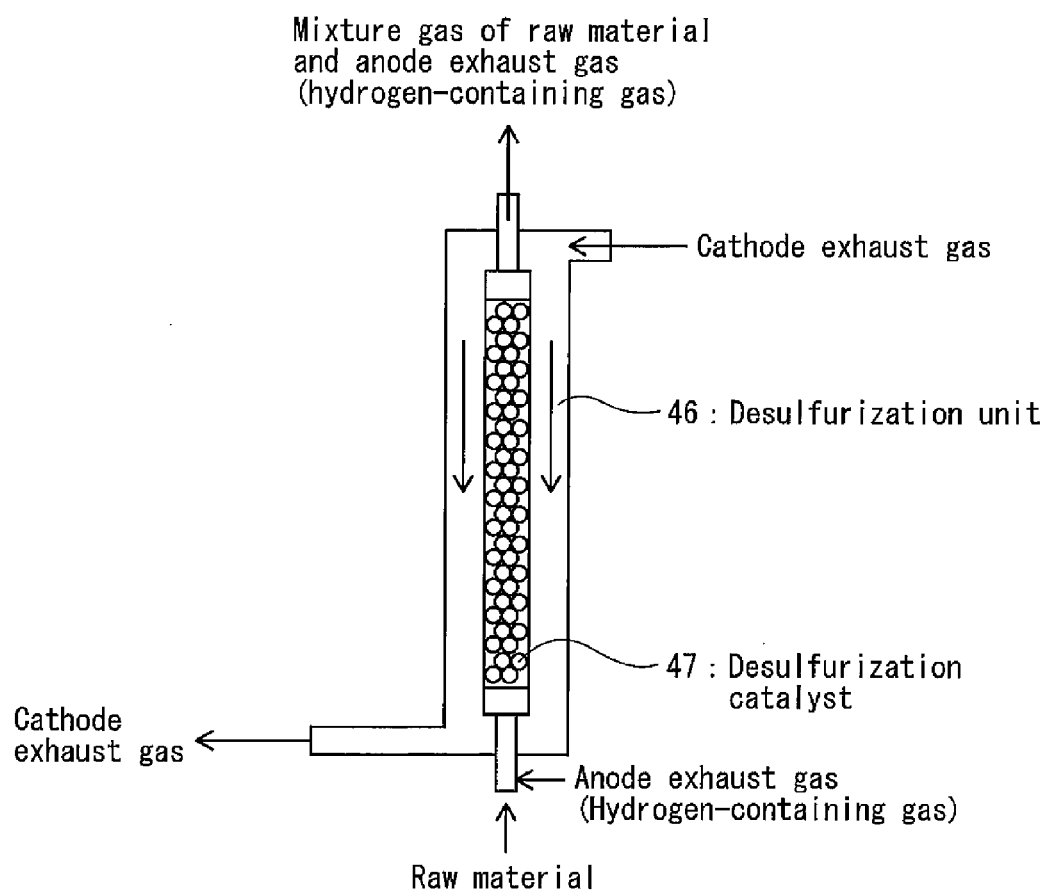
FIG. 2 is a view showing the exemplary configuration of a desulfurization unit included in the fuel cell system of FIG. 1.

Next, the configuration of the desulfurization unit 46 will be described with reference to FIG. 2. FIG. 2 is a view showing the exemplary configuration of the desulfurization unit 46 included in the fuel cell system of FIG. 1. As shown in FIG. 2, the desulfurization unit 46 has a double-pipe structure which allows the mixture gas of the raw material and the anode exhaust gas, and the cathode exhaust gas to flow therethrough such that they are not mixed. More specifically, the desulfurization unit 46 has a structure in which a pipe (inner pipe) with a diameter smaller than that of a pipe (outer pipe) is placed inside the outer pipe. The inner pipe is filled with the desulfurization catalyst 47, and the raw material and the anode exhaust gas (hydrogen-containing gas) flow within the inner pipe. The cathode exhaust gas flows through a space (space formed between the outer pipe and the inner pipe) surrounding the outer periphery of the inner pipe, in a direction which is opposite to the flow direction of the mixture gas of the raw material and the anode exhaust gas. While the cathode exhaust gas and the mixture gas are flowing through the desulfurization unit 46, heat exchange occurs.

Specifically, the cathode exhaust gas is supplied in a temperature state of 270 degrees C. to 350 degrees C. to the desulfurization unit 46, transfers heat to the mixture gas, and is discharged in a temperature state of 250 degrees C. to 330 degrees C. from the desulfurization unit 46. This temperature decrease (corresponding to about 20 degrees C.) results from the heat transfer to the mixture gas and heat radiation. Meanwhile, the mixture gas of the raw material gas and the anode exhaust gas (hydrogen-containing gas) is supplied in a room temperature state to the desulfurization unit 46, deprives heat from the cathode exhaust gas, and then is discharged in a temperature state of 250 degrees C. to 330 degrees C. from the desulfurization unit 46. As the desulfurization catalyst 47 incorporated into the desulfurization unit 46, there is a catalyst (e.g., mixture of copper, zinc oxide, and aluminum oxide), etc., which is suitable for the hydrodesulfurization.

Since the cathode exhaust gas with a high flow rate and a high heat capacity is flowed through the space surrounding the outer periphery of the inner pipe, it becomes easy to keep the desulfurization unit 46 at a constant temperature. This allows the desulfurization unit 46 to be kept at the predetermined temperature (e.g., about 250 degrees C. to 320 degrees C.) in a catalytic activity temperature range.

Figure 3:
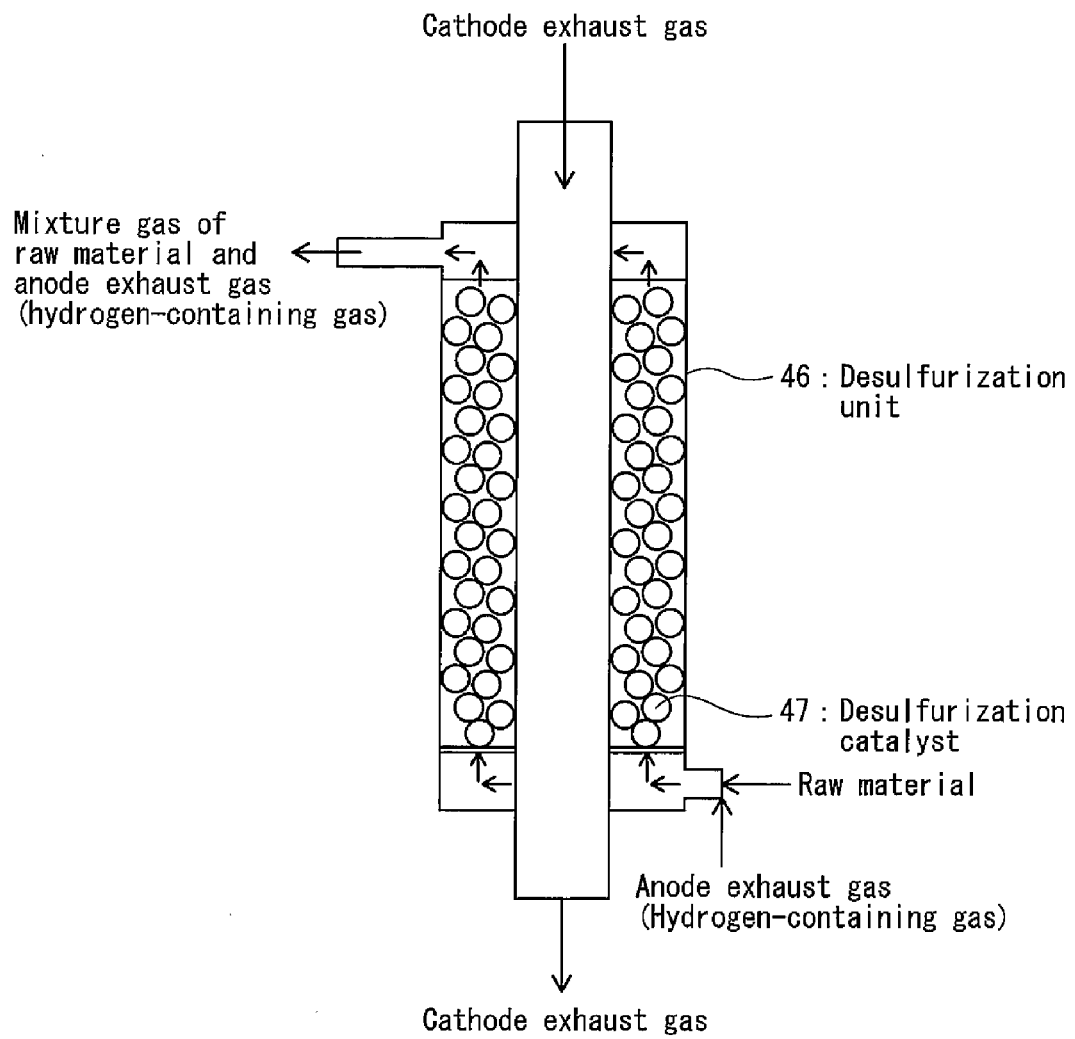
FIG. 3 is a view showing the exemplary configuration of the desulfurization unit included in the fuel cell system of FIG. 1.

The configuration of the desulfurization unit 46 is not limited to the configuration of FIG. 2. For example, as shown in FIG. 3, the desulfurization unit 46 may be configured such that the cathode exhaust gas flows through the inner pipe, and the mixture gas of the raw material and the anode exhaust gas (hydrogen-containing gas) flows through a space surrounding the outer periphery of the inner pipe. FIG. 3 is a view showing the exemplary configuration of the desulfurization unit 46 included in the fuel cell system of FIG. 1.

Specifically, the desulfurization unit 46 of FIG. 3 has a double-pipe structure as in the desulfurization unit 46 of FIG. 2, but is different from the desulfurization unit 46 of FIG. 2 in that the cathode exhaust gas flows through the inner pipe of the double-pipe structure and the mixture gas of the raw material and the anode exhaust gas (hydrogen-containing gas) flows through the space surrounding the outer periphery of the inner pipe (space formed between the inner pipe and the outer pipe).

The desulfurization unit 46 configured as described above can make the heat radiation area of the cathode exhaust gas with a high heat capacity, smaller than that of the configuration of FIG. 2. Therefore, the temperature of the cathode exhaust gas discharged from the desulfurization unit 46 can be made about 10 degrees C. higher than that in the configuration of FIG. 2 (lowered to 260 degrees C. to 340 degrees C.).

Therefore, the heat amount and temperature of the cathode exhaust gas supplied to the evaporation unit 10 which is located downstream of the desulfurization unit 46 are increased. As a result, the fuel cell system can be operated with high efficiency. The reason is as follows. When the heat amount and temperature of the cathode exhaust gas supplied to the evaporation unit 10 are increased, the temperature of the evaporation unit 10 is increased. As a result, the temperature of the steam which is generated by evaporation of the condensed water in the evaporation unit 10 and then discharged, is increased, and hence the temperature of the raw material added with the steam is increased.

Since the temperature of the raw material supplied to the reformer 12 is increased as described above, the temperature of the anode gas generated in the reformer 12 by using this raw material is also increased. This makes it possible to reduce the flow rate of the fuel required to supply heat in a self-sustainable manner within the fuel cell 20 and keep its temperature. In other words, in the fuel cell system, the flow rate of the fuel used for purposes which are other than the power generation reaction can be reduced, which can increase the ratio of the fuel used in the power generation reaction to the fuel supplied to the fuel cell system. As a result, it becomes possible to reduce the flow rate of the raw material supplied from outside to the fuel cell system to allow the electric power of a predetermined amount to be generated. Thus, the fuel cell system according to Embodiment 1 is able to operate with high efficiency.

As should be understood from the above, the fuel cell system according to Embodiment 1 is able to easily keep the desulfurization unit 46 at the predetermined temperature without a need for special control, differently from the fuel cell system disclosed in, for example, the above mentioned Patent Literature 1. Therefore, it becomes possible to provide the fuel cell system with high reliability, high efficiency, and low cost.

(Embodiment 2)

Figure 4:
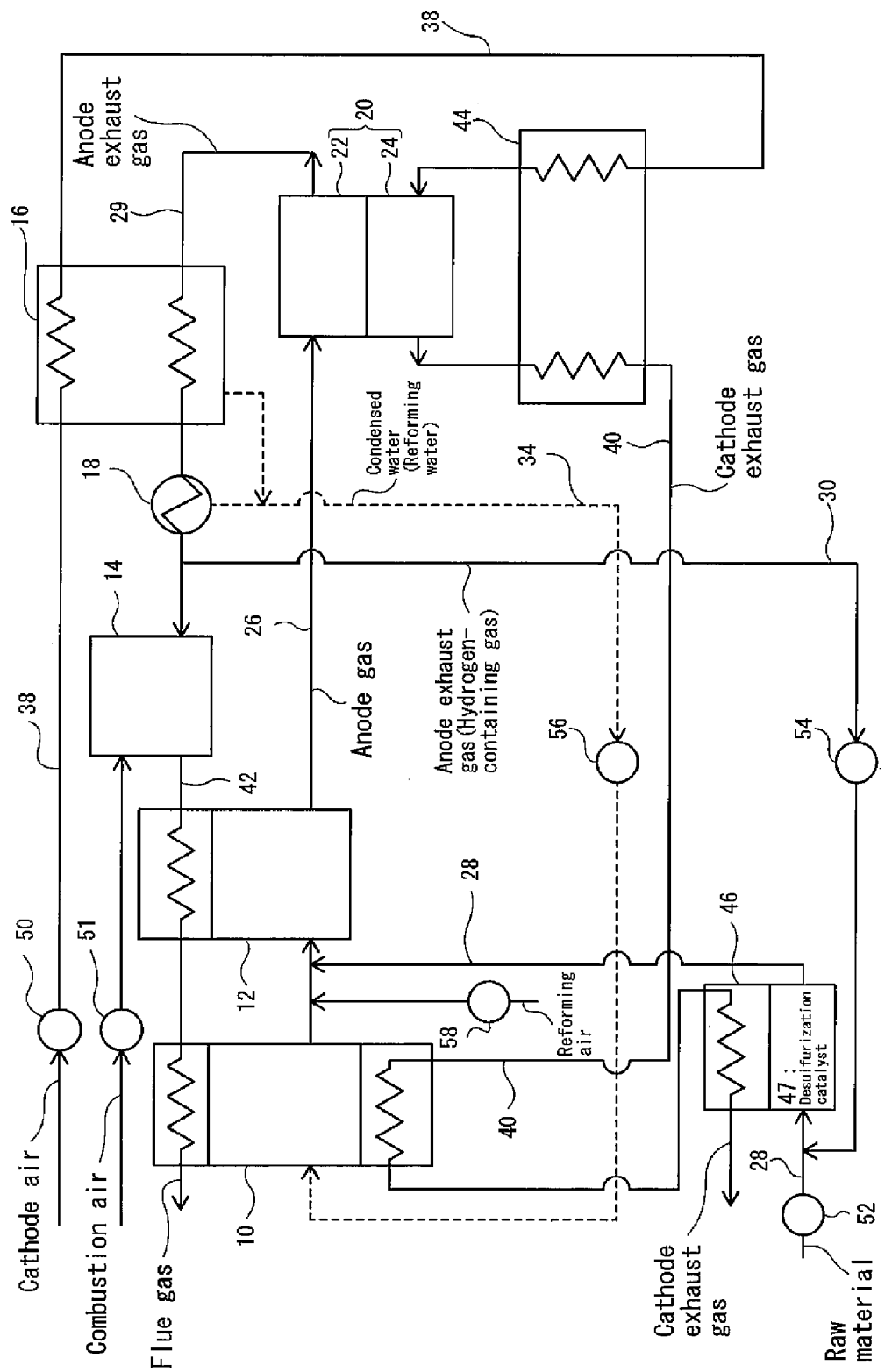
FIG. 4 is a block diagram showing the example of a fuel cell system according to Embodiment 2.

Next, a fuel cell system according to Embodiment 2 will be described with reference to FIG. 4. Regarding the fuel cell system according to Embodiment 2, the components and operation which are the same as those of Embodiment 1 will not be described repeatedly. FIG. 4 is a block diagram showing the example of the fuel cell system according to Embodiment 2.

As shown in FIG. 4, the fuel cell system according to Embodiment 2 is different from the fuel cell system according to Embodiment 1 in the passage (cathode exhaust gas passage 40) through which the cathode exhaust gas flows. Specifically, the difference is as follows. In Embodiment 1, the cathode exhaust gas flows through the desulfurization unit 46 and the evaporation unit 10 in this order in the cathode exhaust gas passage 40 after it has been discharged from the cathode air heat exchanger 44. In contrast, in Embodiment 2, the cathode exhaust gas flows through the evaporation unit 10 and the desulfurization unit 46 in this order in the cathode exhaust gas passage 40 after it has been discharged from the cathode air heat exchanger 44.

For example, in a case where the temperature (about 350 degrees C. to 380 degrees C.) of the cathode exhaust gas which has been discharged from the cathode air heat exchanger 44 is not lowered to about 250 degrees C. to 320 degrees C. as a result of the heat radiation that occurs while the cathode exhaust gas is flowing toward the desulfurization unit 46, the cathode exhaust gas is supplied to the evaporation unit 10 before it is supplied to the desulfurization unit 46. By heat exchange with the reforming water in the evaporation unit 10, the temperature of the cathode exhaust gas is lowered to about 250 degrees C. to 320 degrees C., and then the cathode exhaust gas with the lowered temperature is supplied to the desulfurization unit 46.

This configuration provides the advantages as follows. In a case where the temperature of the cathode exhaust gas supplied from the cathode air heat exchanger 44 to the desulfurization unit 46 is too high, the temperature of the cathode exhaust gas can be lowered to an appropriate temperature by the heat exchange in the evaporation unit 10, and then the cathode exhaust gas with the appropriate temperature can be supplied to the desulfurization unit 46. Or, in a case where the catalytic activity temperature range of the desulfurization catalyst 47 filled in the desulfurization unit 46 is, for example, 100 degrees C. to 250 degrees C., which is lower than the above stated range of 250 degrees C. to 320 degrees C., the temperature of the desulfurization unit 46 can be kept steadily in this temperature range.

(Embodiment 3)

Figure 5:
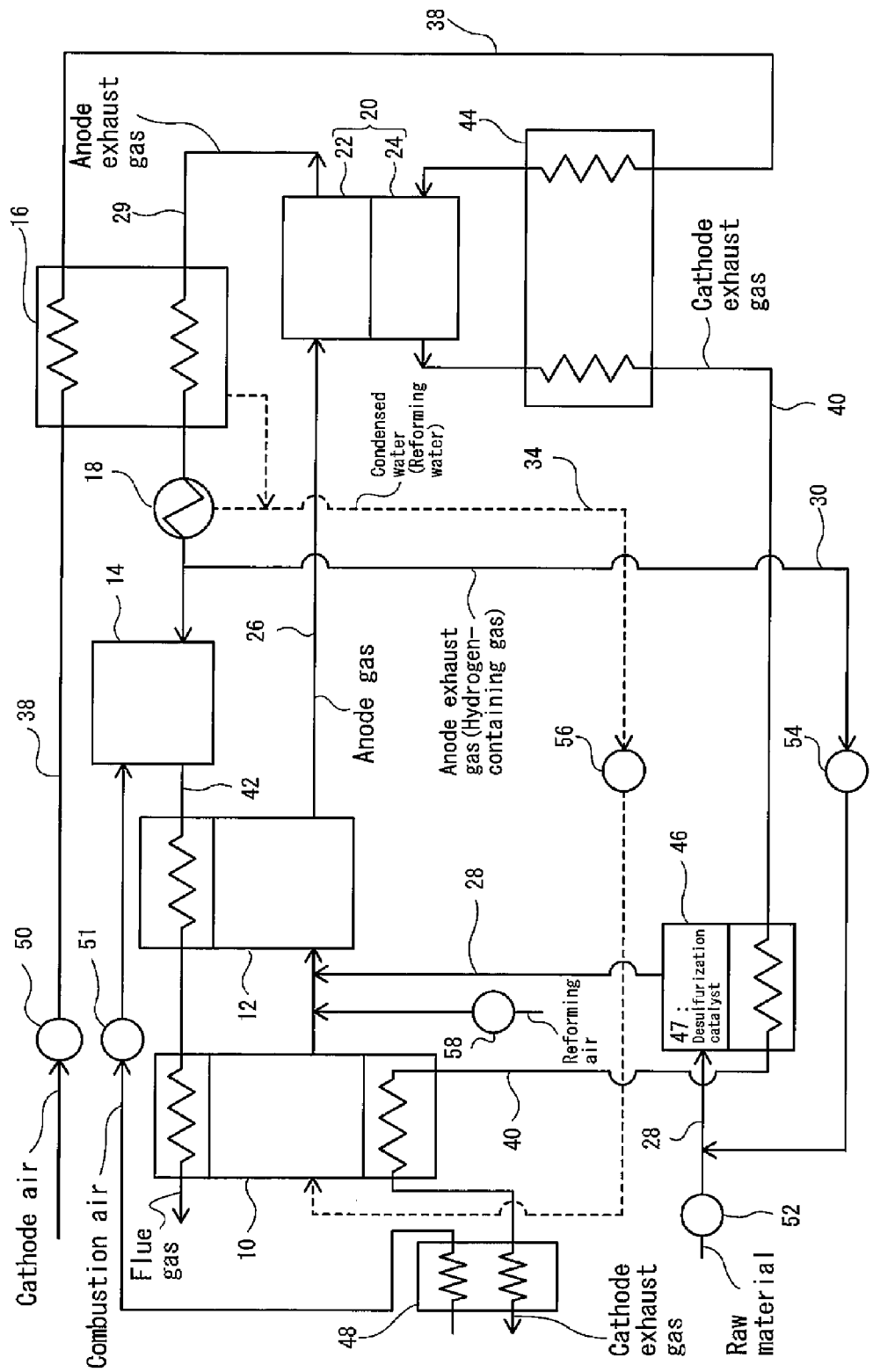
FIG. 5 is a block diagram showing the example of a fuel cell system according to Embodiment 3.

Next, a fuel cell system according to Embodiment 3 will be described with reference to FIG. 5. Regarding the fuel cell system according to Embodiment 3, the components and operation which are the same as those of Embodiment 1 will not be described repeatedly. FIG. 5 is a block diagram showing the example of the fuel cell system according to Embodiment 3.

As shown in FIG. 5, the fuel cell system according to Embodiment 3 is different from the fuel cell system according to Embodiment 1 in that the fuel cell system of Embodiment 3 further includes a heat exchanger 48, and the passage (cathode exhaust gas passage 40) through which the cathode exhaust gas flows is different from that of the fuel cell system of Embodiment 1. Specifically, the difference is as follows. In Embodiment 1, the cathode exhaust gas flows through the desulfurization unit 46 and the evaporation unit 10 in this order in the cathode exhaust gas passage 40 after it has been discharged from the cathode air heat exchanger 44. In contrast, in Embodiment 3, the heat exchanger 48 is further provided downstream of the evaporation unit 10, and performs heat exchange between the cathode exhaust gas which has been discharged from the evaporation unit 10 and the combustion air to be supplied to the combustion unit 14 (combustion air which is before being supplied to the combustion unit 14). The heat energy of the cathode exhaust gas is transferred to the combustion air to pre-heat the combustion air.

As described above, in the fuel cell system of Embodiment 3, since the combustion air can be pre-heated, the temperature of the combustion air to be supplied to the combustion unit 14 can be increased. In addition, since the temperature of the combustion air can be increased, the temperature of the combustion unit 14 can also be increased.

Since the temperature of the combustion unit 14 can be increased, the temperature of the combustion exhaust gas discharged from the combustion unit 14 to the reformer 12 is also increased, and as a result, the temperature of the reformer 12 is also increased. In addition, since the temperature of the reformer 12 is increased, the reforming efficiency of the reformer 12 can be improved, and the temperature of the anode gas discharged from the reformer 12 is also increased. Furthermore, since it becomes possible to reduce the flow rate of the anode exhaust gas used in the combustion when the combustion unit 14 is increased to the predetermined temperature in the fuel cell system, the fuel supplied to the fuel cell system can be reduced, and the ratio of the fuel used in the power generation reaction can be increased. As a result, it becomes possible to reduce the flow rate of the raw material supplied to the fuel cell system from outside to allow the electric power of a predetermined amount to be generated. Therefore, the efficiency of the system can be increased.

Since the temperature of the anode gas supplied from the reformer 12 to the anode 22 is increased, the anode 22 of the fuel cell 20 can be easily kept at the predetermined temperature, which can prevent a temperature decrease due to the reforming within the anode 22. Because of this, the temperature of the fuel cell 20 can be stabilized, and hence reliability and durability of the fuel cell 20 can be improved. In addition, since the flow rate of the fuel used for purposes which are other than the power generation reaction can be reduced, the ratio of the fuel used in the power generation reaction to the fuel supplied to the fuel cell system can be increased. As a result, it becomes possible to reduce the flow rate of the raw material supplied to the fuel cell system from outside to allow the electric power of a predetermined amount to be generated. Therefore, the efficiency of the system can be increased.

(Embodiment 4)

Figure 6:
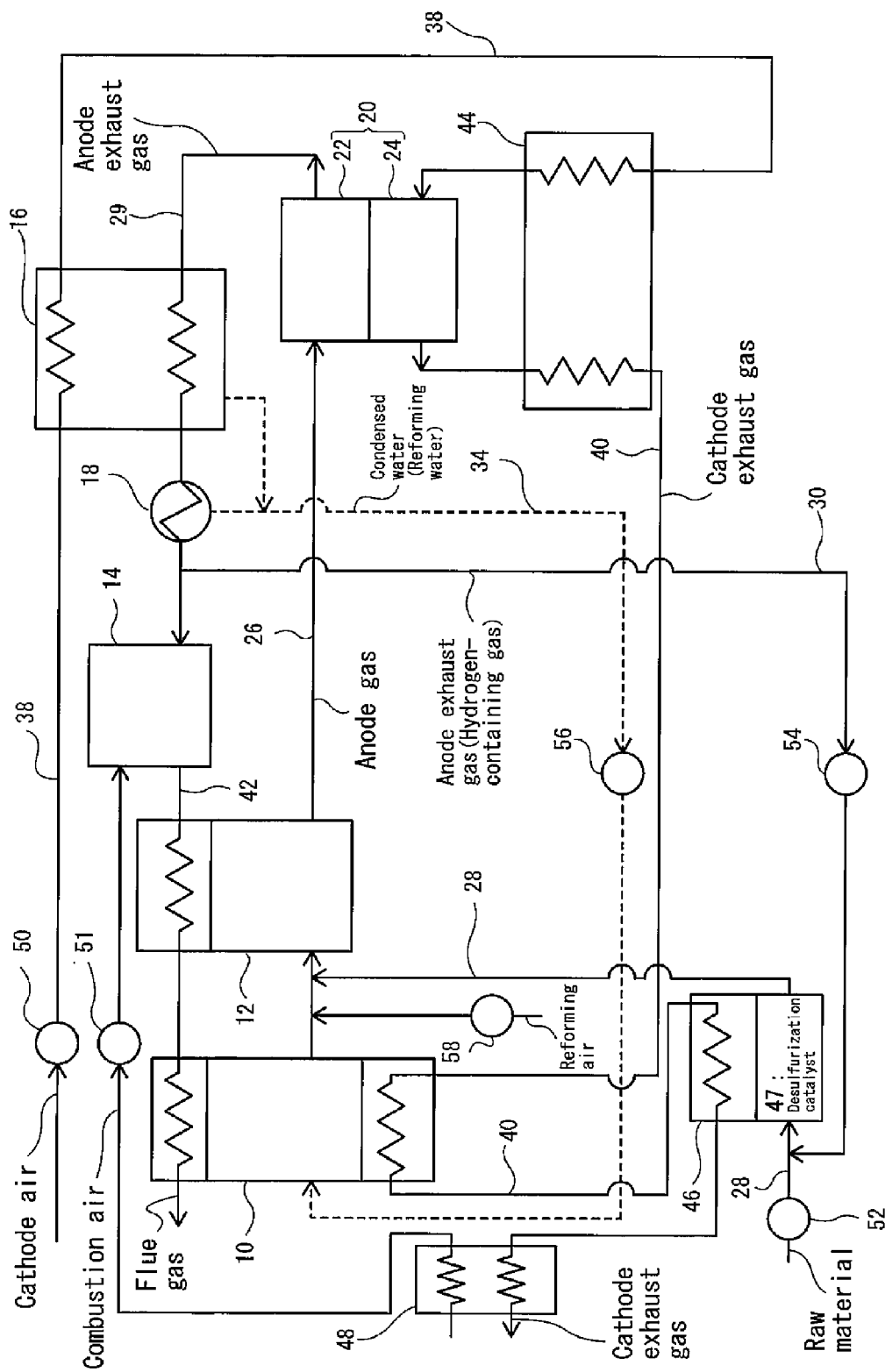
FIG. 6 is a block diagram showing the example of a fuel cell system according to Embodiment 4.

Next, a fuel cell system according to Embodiment 4 will be described with reference to FIG. 6. Regarding the fuel cell system according to Embodiment 4, the components and operation which are the same as those of Embodiment 1 will not be described repeatedly. FIG. 6 is a block diagram showing the example of the fuel cell system according to Embodiment 4.

As shown in FIG. 6, the fuel cell system according to Embodiment 4 is different from the fuel cell system according to Embodiment 1 in that the fuel cell system of Embodiment 4 further includes a heat exchanger 48, and the passage (cathode exhaust gas passage 40) through which the cathode exhaust gas flows is different from that of the fuel cell system of Embodiment 1. Specifically, the difference is as follows. In Embodiment 1, the cathode exhaust gas flows through the desulfurization unit 46 and the evaporation unit 10 in this order in the cathode exhaust gas passage 40 after it has been discharged from the cathode air heat exchanger 44. In contrast, in Embodiment 4, the heat exchanger 48 is further provided downstream of the desulfurization unit 46. The cathode exhaust gas flows through the evaporation unit 10, the desulfurization unit 46, and the heat exchanger 48 in this order in the cathode exhaust gas passage 40 after it has been discharged from the cathode air heat exchanger 44.

In other words, the fuel cell system according to Embodiment 4 is a combination of the fuel cell system according to Embodiment 2 and the fuel cell system according to Embodiment 3. Therefore, as described above, the fuel cell system according to Embodiment 4 can achieve advantage of the fuel cell system according to Embodiment 2 and the advantage of the fuel cell system according to Embodiment 3.

Specifically, in the fuel cell system according to Embodiment 4, as in the fuel cell system according to Embodiment 2, the desulfurization unit 46 can be kept at 100 degrees C. to 250 degrees C. which is the catalytic activity temperature range of the desulfurization catalyst 47, when the catalytic activity temperature range is 100 degrees C. to 250 degrees C. Or, in a case where the temperature of the cathode exhaust gas which has been discharged from cathode air heat exchanger 44 is too high, and thereby the cathode exhaust gas in a temperature state which is higher than a desired temperature range, is supplied to the desulfurization unit 46, the temperature of the cathode exhaust gas can be lowered to the desired temperature range in the evaporation unit 10, and then the cathode exhaust gas in this range can be supplied to the desulfurization unit 46.

In addition, the fuel cell system according to Embodiment 4 can improve the reliability and durability of the fuel cell 20, as in the fuel cell system according to Embodiment 3. In addition, since the flow rate of the fuel used for purposes which are other than the power generation reaction can be reduced in the fuel cell system, the ratio of the fuel used in the power generation reaction to the fuel supplied to the fuel cell system can be increased. As a result, it becomes possible to reduce the flow rate of the raw material supplied to the fuel cell system from outside to allow the electric power of a predetermined amount to be generated. Therefore, the efficiency of the system can be increased.

In Embodiment 1 to Embodiment 4 as described above, hydrogen required to perform the hydrodesulfurization in the desulfurization unit 46 is obtained from a part of the anode exhaust gas, the part resulting from dividing of the flow of the anode exhaust gas including the anode gas (reformed gas) remaining unused in the fuel cell 20. However, this configuration is merely exemplary. For example, the flow of the anode gas (hydrogen-containing gas) generated in the reformer 12 may be divided and a part of the anode gas may be guided to the upstream side of the desulfurization unit 46. Moreover, hydrogen may be supplied to the desulfurization unit 46 from outside.

Nonetheless, the configuration for obtaining hydrogen from the anode exhaust gas discharged from the anode 22 has an advantage over the configuration for supplying hydrogen from outside, because there is no need to prepare hydrogen and therefore cost is low. In addition, in the configuration for obtaining hydrogen from a part of the anode gas generated in the reformer 12, it is necessary to generate extra anode gas which will result from dividing of the flow of the anode gas, in addition to the anode gas to be supplied to the anode 22, whereas in the configuration for obtaining hydrogen from the anode exhaust gas discharged from the anode 22, it is not necessary to generate such an extra anode gas. This provides an advantage.

In the above configuration, the desulfurization unit 46 removes the sulfur component from the raw material by the hydrodesulfurization method in such a manner that it generates hydrogen sulfide from the supplied raw material and hydrogen contained in the anode exhaust gas, and chemically adsorbs sulfur in hydrogen sulfide onto the desulfurization catalyst 47. Alternatively, the desulfurization unit 46 may include the desulfurization catalyst 47 which adsorbs sulfur at a temperature (e.g., about 70 degrees C. to 250 degrees C.) which is higher than a room temperature, by a method which is different from the hydrodesulfurization method. As examples of such a desulfurization catalyst 47, a catalyst which carries onto zeolite metal such as silver, copper, or zinc, a metal oxide of this metal, or the metal and the metal oxide, may be used.

For example, in a case where a catalyst which has a reaction temperature range of about 100 degrees C. is used as the desulfurization catalyst 47, the fuel cell system according to Embodiment 1 and the fuel cell system according to Embodiment 3 are configured such that the cathode air heat exchanger 44 operates to adjust the temperature of the cathode exhaust gas so that it reaches, for example, about 100 degrees C., and supplies the cathode exhaust gas with this temperature to the desulfurization unit 46. Specifically, the temperature of the cathode exhaust gas can be lowered to about 100 degrees C., by changing the flow rates of the cathode air and of the cathode exhaust gas flowing through the cathode air heat exchanger 44, or by increasing the range in which the heat exchange between the cathode air and the cathode exhaust gas occurs.

In contrast, in the fuel cell system according to Embodiment 2 and the fuel cell system according to Embodiment 4, the temperature of the cathode exhaust gas is lowered to about 100 degrees C., by the heat exchange in each of the cathode air heat exchanger 44 and the evaporation unit 10, and then the cathode exhaust gas with this temperature is supplied to the desulfurization unit 46.

In addition, in a case where the desulfurization unit 46 includes the desulfurization catalyst 47 which adsorbs sulfur at a temperature which is higher than a room temperature, it is not necessary to supply the hydrogen-containing gas to the desulfurization unit 46. Therefore, in this case, the recycle passage 30 through which a part of the anode exhaust gas flows and the hydrogen supply unit 54 may be omitted.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

A fuel cell system of the present invention is configured to control the temperature of the desulfurization unit 46 so that it falls in an appropriate temperature range. Therefore, this fuel cell system is widely applicable to a fuel cell system including the desulfurization unit 46 which removes the sulfur component from the raw material gas.

REFERENCE SIGNS LIST

10 evaporation unit
12 reformer
14 combustion unit
16 anode exhaust gas condenser
18 anode exhaust gas heat radiator
20 fuel cell
22 anode
24 cathode
26 anode gas passage
28 raw material passage
29 anode exhaust gas passage
30 recycle passage
34 condensed water passage
38 cathode air passage
40 cathode exhaust gas passage
42 combustion exhaust gas passage
44 cathode air heat exchanger
46 desulfurization unit
48 heat exchanger
50 cathode air supply unit
51 combustion air supply unit
52 raw material supply unit
54 hydrogen supply unit
56 reforming water pump
58 reforming air pump

The invention claimed is:

1. A fuel cell system comprising:
   a fuel cell configured to generate electric power through a power generation reaction by using fuel supplied to an anode and air supplied to a cathode;
   a cathode air heat exchanger configured to perform heat exchange between a cathode exhaust gas which is air discharged after the air has been used in the fuel cell and the air to be supplied to the cathode to transfer a part of heat energy of the cathode exhaust gas to the air;
   a desulfurization unit configured to remove a sulfur component from a raw material supplied to the desulfurization unit;

a reformer configured to generate a reformed gas which is the fuel from steam and the raw material from which the sulfur component has been removed by the desulfurization unit; and a combustion unit configured to combust an anode exhaust gas discharged from the anode after an anode gas has been used as the fuel in the fuel cell, wherein the cathode exhaust gas flows through the cathode air heat exchanger without flowing through the combustion unit, the cathode exhaust gas which has lost a part of the heat energy by the heat exchange in at least the cathode air heat exchanger, is supplied to the desulfurization unit, and the desulfurization unit is heated by the heat energy of the cathode exhaust gas.

2. The fuel cell system according to claim 1, further comprising:

an anode exhaust gas condenser configured to perform heat exchange between the anode exhaust gas and the air to be supplied to the cathode such that a part of heat energy of the anode exhaust gas is transferred to the air, to condense the anode exhaust gas to recover condensed water;

wherein the air which has been pre-heated by a part of the heat energy of the anode exhaust gas by the heat exchange in the anode exhaust gas condenser is supplied to the cathode air heat exchanger.

3. The fuel cell system according to claim 2, wherein the desulfurization unit is configured to remove the sulfur component from the raw material by a hydrodesulfurization method.

4. The fuel cell system according to claim 3, further comprising:

a recycle passage which is configured to divide a flow of the anode exhaust gas from which the condensed water has been recovered in the anode exhaust gas condenser such that a part of the anode exhaust gas is supplied to an upstream side of the desulfurization unit;

wherein the desulfurization unit is configured to include a desulfurization catalyst which adsorbs the sulfur component in the raw material, of a mixture gas of the part of the anode exhaust gas and the raw material.

5. The fuel cell system according to claim 2, wherein the combustion unit is configured to combust the anode exhaust gas from which the condensed water has been recovered in the anode exhaust gas condenser, by using combustion air supplied to the combustion unit; and wherein the reformer is configured to generate the reformed gas from the raw material and the steam which are supplied to the reformer, through a reforming reaction, by using heat energy of a combustion exhaust gas generated by combustion of the anode exhaust gas in the combustion unit.

6. The fuel cell system according to claim 5, further comprising:

an evaporation unit which is supplied with the combustion exhaust gas discharged after a part of the heat energy of the combustion exhaust gas has been used in the reformer, and evaporates the condensed water by using the heat energy of the combustion exhaust gas to generate the steam added to the raw material to be supplied to the reformer.

7. The fuel cell system according to claim 5, further comprising:

an evaporation unit which is supplied with the combustion exhaust gas discharged after a part of the heat energy of the combustion exhaust gas has been used in the reformer and the cathode exhaust gas discharged after a part of the heat energy of the cathode exhaust gas has been used by heating the desulfurization unit, and evaporates the condensed water by the heat energy of the combustion exhaust gas and the heat energy of the cathode exhaust gas to generate the steam added to the raw material to be supplied to the reformer.

8. The fuel cell system according to claim 5, further comprising:

an evaporation unit which is supplied with the combustion exhaust gas discharged after a part of the heat energy of the combustion exhaust gas has been used in the reformer and the cathode exhaust gas discharged after a part of the heat energy of the cathode exhaust gas has been used by the heat exchange in the cathode air heat exchanger, and evaporates the condensed water by the heat energy of the combustion exhaust gas and the heat energy of the cathode exhaust gas to generate the steam added to the raw material to be supplied to the reformer;

wherein the cathode exhaust gas discharged after a part of the heat energy of the cathode exhaust gas has been used in the evaporation unit is supplied to the desulfurization unit to heat the desulfurization unit by the heat energy of the cathode exhaust gas.

9. The fuel cell system according to claim 7, further comprising:

a heat exchanger configured to perform heat exchange between the cathode exhaust gas discharged after a part of the heat energy of the cathode exhaust gas has been used in the evaporation unit and the combustion air to be supplied to the combustion unit.

10. The fuel cell system according to claim 8, further comprising:

a heat exchanger configured to perform heat exchange between the cathode exhaust gas discharged after a part of the heat energy of the cathode exhaust gas has been used in the desulfurization unit and the combustion air to be supplied to the combustion unit.

11. The fuel cell system according to claim 1, further comprising:

an anode exhaust gas condenser configured to perform heat exchange between the anode exhaust gas and air to be supplied to the cathode such that a part of heat energy of the anode exhaust gas is transferred to the air, to condense the anode exhaust gas to recover condensed water, wherein the anode exhaust gas flows through the anode exhaust gas condenser and the combustion unit in this order.

* * * * *